United States Patent [19]
Larson

[11] Patent Number: 5,713,000
[45] Date of Patent: Jan. 27, 1998

[54] CIRCUITS SYSTEM AND METHODS FOR TRANSFERRING DATA BETWEEN A HOST DEVICE AND A SLAVE DEVICE IN A SINGLE CYCLE USING ALIAS MEMORY

[75] Inventor: Michael Kerry Larson, Austin, Tex.

[73] Assignee: Cirrus Logic, Inc., Fremont, Calif.

[21] Appl. No.: 457,220

[22] Filed: Jun. 1, 1995

[51] Int. Cl.$^6$ .................................................. G06F 13/14
[52] U.S. Cl. ................ 395/421.1; 395/823; 395/421.07
[58] Field of Search .................................. 395/825, 842, 395/854, 492, 164, 421.1, 846, 511, 515, 525, 526, 412, 421.07

[56] References Cited

U.S. PATENT DOCUMENTS 5,473,761  12/1995  Parks et al. ............................. 395/404
5,564,009  10/1996  Pinedo et al. ........................... 395/509

*Primary Examiner*—Eddie P. Chan
*Assistant Examiner*—Vincent Yip
*Attorney, Agent, or Firm*—Kelly K. Kordzik; James J. Murphy; Steven A. Shaw

[57] ABSTRACT

Within a data processing system, data transfer between a host device and a slave device is accomplished with only one write operation. The write operation performed by the host device, such as a central processing unit, is performed to an alias destination address, which is related to the destination address by an offset number. The data included within the write operation includes the source address of the data to be transferred. Such a data transfer operation could be utilized to transfer data to a display adapter for display of video related data on a display device.

29 Claims, 5 Drawing Sheets

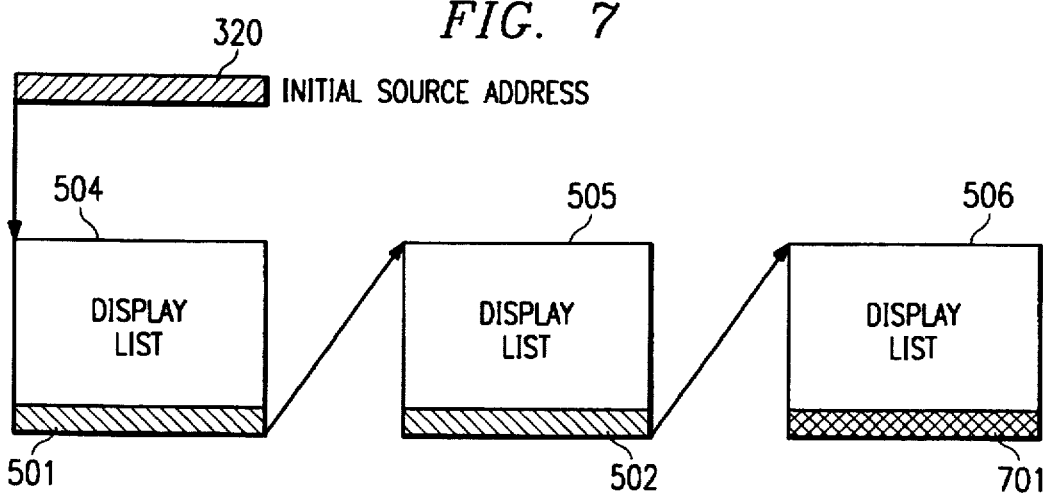
FIG. 7
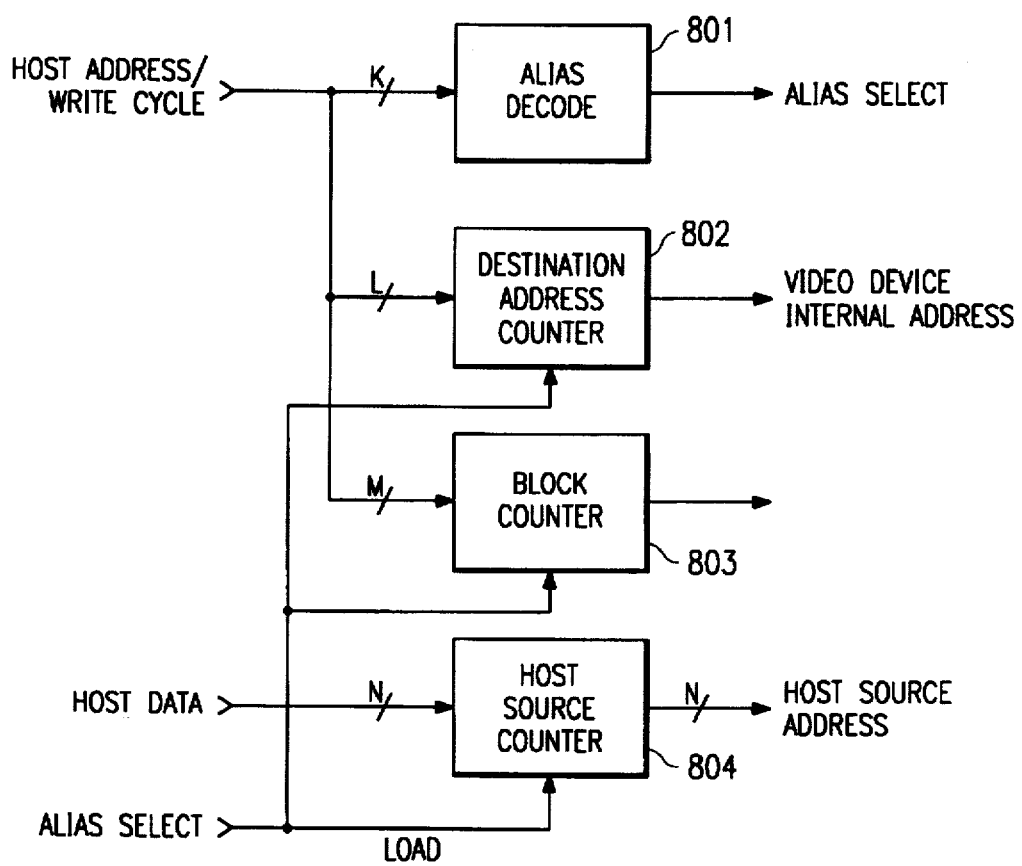
FIG. 8
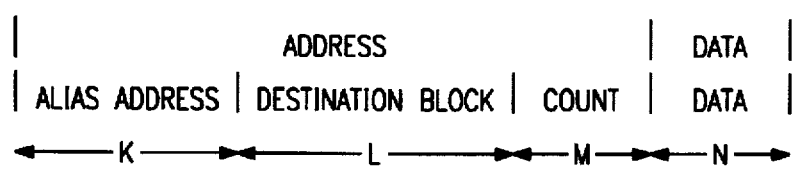

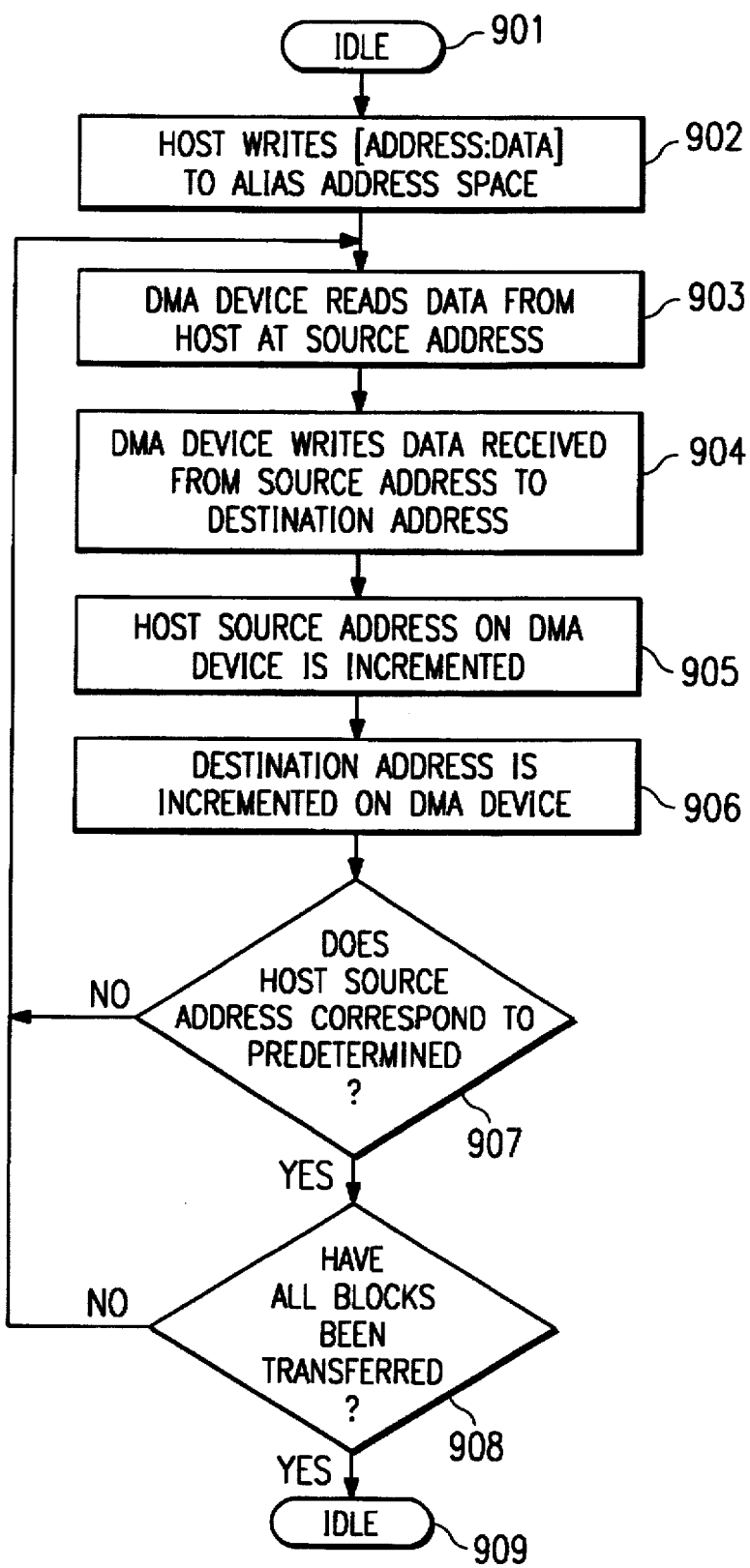

CIRCUITS SYSTEM AND METHODS FOR TRANSFERRING DATA BETWEEN A HOST DEVICE AND A SLAVE DEVICE IN A SINGLE CYCLE USING ALIAS MEMORY

FIELD OF THE INVENTION

The present invention pertains in general to data processing systems, and in particular, to a system and method for transferring data from a host device to a slave device.

BACKGROUND OF THE INVENTION

A typical data processing system may have one or more host devices (e.g., a central processing unit ("CPU")) and one or more slave devices (e.g., a display adapter, a disk device, or a SCSI (small computer system interface) device) coupled by one or more buses. Generally, the overall operational efficiency and speed of the data processing system is dependent upon the speed and availability of the CPU. Almost all CPUs are based on the von Neumann architecture, which uses the familiar concept of sequential processing, a one-instruction-at-a-time approach to operations. Consequently, if a CPU is busy managing one task, it is unavailable to manage any other tasks at that time. Thus, it is desirous to design a data processing system so that the CPU manages any one particular task for a very short time and quickly becomes available to perform another task.

One way to free up the CPU is to download tasks to slave devices coupled to the CPU. As an example, the task of writing video data to a display screen is generally downloaded to a display adapter so that the CPU is not required to continually perform this task, which literally can be a continuous job.

However, a slave device, such as the display adapter, still requires the CPU to provide it with the address of the data to be displayed. To initiate this process, prior art data processing systems require the CPU to perform three write operations to registers within the display adapter. First, the source address of the data required by the slave device must be written to a register in the slave device. Second, the destination address to where the data is to be sent must be written to a register. And, third, the length of the data to be transferred to the slave device must be provided to a register in the slave device.

These three write operations may also include acknowledgments and other control signals per write operation, tying up the CPU for a "considerable" amount of time. Therefore, there is a need in the art for a technique of data transfer from a host device to a slave device that requires a minimum number of write operations in order to perform the data transfer.

SUMMARY OF THE INVENTION

The present invention satisfies the foregoing need by providing a data processing system whereby data is transferred to a slave device through control of the host device using one write operation. This is accomplished by aliasing the destination address and writing the host source address as data to the aliased destination address. The alias destination address is related to the actual destination address by a count parameter (which may be equal to the bit, byte or word length of the memory in the slave device). The alias section of memory is identical to the destination address in that certain bits are ignored so that the actual write operation to this address is equivalent to a write operation to the actual destination address. The alias address provides an offset into the destination address.

The reduced number of write operations also reduces the number of registers required in the slave device. This in turn reduces the number of gates required, reduces the actual set-up time, and increases the speed of data transfer to the slave device.

In an alternative embodiment of the present invention, a number of linked data lists (e.g., display lists) are transferred wherein at each end of each display list, a link indicator is provided linking one display list to the next display list. At the end of the last display list, a stop indicator is provided to indicate stoppage of the data transfer.

In yet another alternative embodiment of the present invention, a count is written along with the source address for the data in the initial write operation to the alias destination address. This count parameter indicates the number of linked display lists to be transferred to the slave device so that the stop indicator mentioned above is not required to indicate the end of the data transfer.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 7 illustrates a linking of display lists in accordance with the memory map illustrated in FIG. 6;

FIG. 8 illustrates hardware used to implement the present invention; and

FIG. 9 illustrates a flow diagram describing one embodiment of the present invention.

DETAILED DESCRIPTION OF A PREFERRED EMBODIMENT OF THE INVENTION

Figure 1:
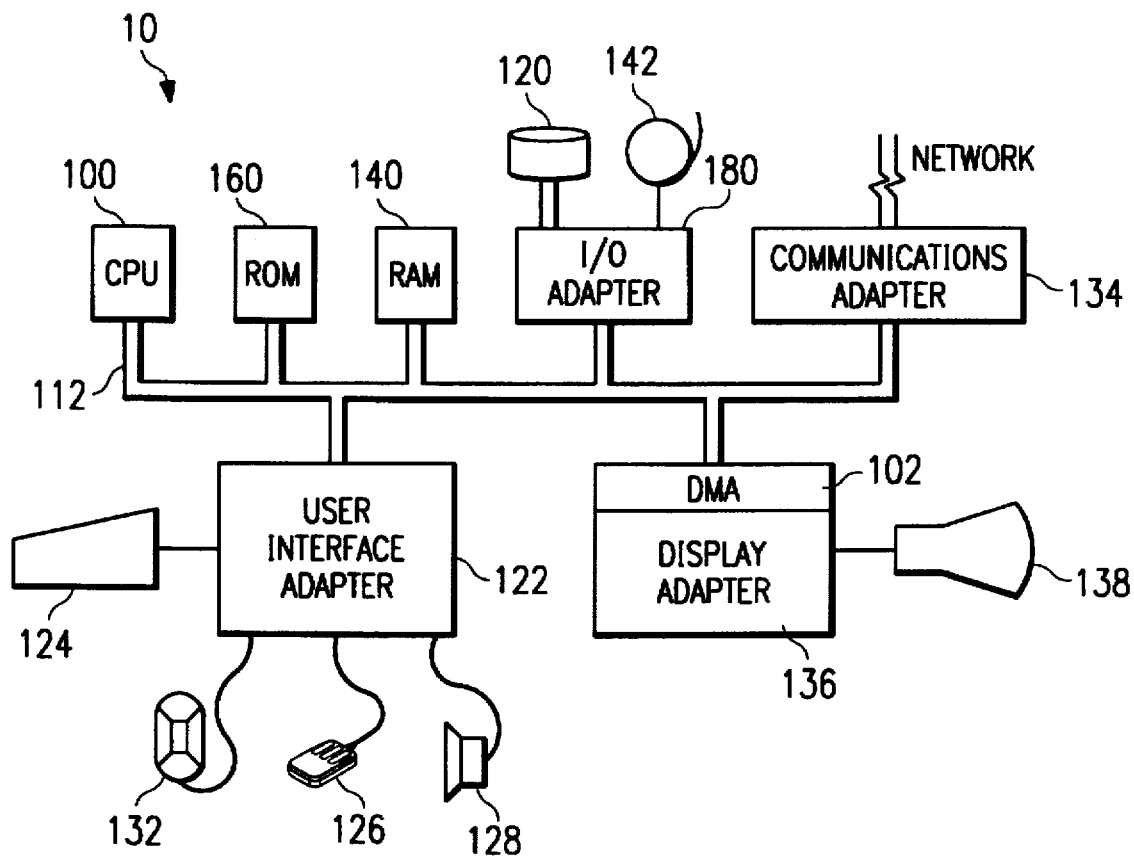
FIG. 1 illustrates a data processing system configured in accordance with the present invention.

In the following description, numerous specific details such as word lengths, etc., are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The goal of the present invention is to allow the transparent transfer of data from one memory to another in a data processing system without the intervention of a host device (also referred to herein as the "host"). A host device is some digital device that creates data in a memory space. Such data will be hereinafter referred to as the source data. The host may be a single processor within a single processing system or one of many processors within a multiprocessing system. Furthermore, the host may be a virtual processor.

The transfer of data from one physical memory to another may be accomplished by a slave device such as those discussed above. The goal of the present invention is to provide for the transfer of the source data from a source location to a destination location by the slave device. However, it is required that the host device provide the initial parameters needed by the slave device for the transfer of data. Typically, such parameters include the source address for the data indicating the address of the location from where the data is to be retrieved by the slave device, the destination address indicating the physical address to where the data is to be transferred to, and the length of the data to be transferred.

Though the data to be transferred may be of any format, a typical example of such data is data to be displayed on a display device, such as bit-map data or live video data that is transferred to the display adapter, which is the destination for the data. The display adapter will then display this data on an attached display screen in a well-known manner.

For example, a processor may produce bit-map data to be displayed on the display device, or the processor may retrieve live video data from an attached CD-ROM device and store that data within its random access memory ("RAM"). The video device will have some associated video memory. The processor will perform the transfer of the data from RAM to the video memory and then write that data onto the screen. With the inclusion of a display adapter, the display adapter performs the operation of writing the data to the display screen. The host processor merely is required to provide the source address for the data within RAM so that the display adapter can retrieve the data. This allows the host processor to perform other tasks within the data processing system, including decoding the next flame of data to be displayed.

A representative hardware environment for practicing the present invention is depicted in FIG. 1, which illustrates a typical hardware configuration of workstation 10 in accordance with the subject invention having CPU 100, such as a conventional microprocessor, and a number of other units interconnected via system bus 112. Workstation 10 (data processing system) shown in FIG. 1 includes random access memory (RAM) 140, read only memory (ROM) 160, and input/output (I/O) adapter 180 for connecting peripheral devices such as disk units 120 (or, a CD-ROM) and tape drives 142 to bus 112, user interface adapter 122 for connecting keyboard 124, mouse 126, speaker 128, microphone 132, and/or other user interface devices such as a touch screen device (not shown) to bus 112, communication adapter 134 for connecting workstation 10 to a data processing network, and display adapter 136 for connecting bus 112 to display device 138.

Direct memory access ("DMA") device 102 may be any typical device capable of direct memory access operations, and is utilized in conjunction with display adapter 136. The combination of display adapter 136 and DMA device 102 is referred to herein as a slave device. DMA device 102 may be a DMA controller such as one manufactured by Intel, Inc., model no. 82351. Display adapter 136 may be model no. CL_PX2070 as manufactured by Cirrus Logic, Inc. Such devices may be configured as ISA devices, which are coupled both to the data and address busses of a system. The data and address busses are represented as bus 112 in FIG. 1. If an ISA device such as display adapter 136 asserts a DMA request, then data will be transferred from a host device to the ISA device through the use of the DMA controller.

FIG. 1 will be utilized hereinafter for describing both the prior art and the present invention. However, the present invention uniquely configures workstation 10 as described below.

Figure 2:
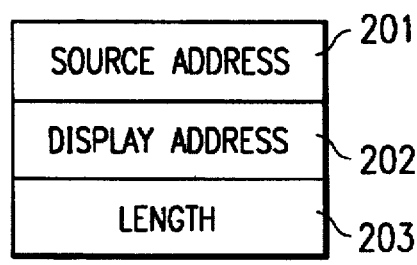
FIG. 2 illustrates registers utilized within a prior art method for data transfer.

Referring to both FIGS. 1 and 2, a typical operation would be for CPU 100 to determine the source address for video data to be transferred. This host source address may be an address within RAM 140, disk unit 120, etc. CPU 100 would write this source address to register 201 residing within DMA device 102.

Next, CPU 100 would determine the display destination address, indicating the address within system 10 of display adapter 136, and would write this destination address into register 202 within DMA device 102. The length of the data to be transferred may be a precalculated value or may be calculated dynamically and is written by CPU 100 into register 203 within DMA device 102. This length of data represents the amount of data that is actually transferred from RAM 140, for example, to display adapter 136. For example, a bit-map image may have a number of pixels in the X and Y direction. Thus, the length would then be XxY. DMA device 102 would then utilize this information within registers 201–203 to fetch the data from RAM 140 for writing into display adapter 136. Display adapter 136 would then transfer this data to display device 138 for display on the screen. Such a transfer to display device 138 may be performed simultaneously as the video data is received, or the data may be written into display adapter 136 during a video blanking period.

The problem with the aforementioned method is that it requires CPU 100, i.e., the host device, to perform three separate transfers (writes) of information to DMA device 102. In other words, CPU 100 has to calculate the source address and then write it out to bus 112, calculate the destination address and write it out onto bus 112, and then also calculate the length and send it out to DMA device 102 by bus 112. It is the goal of the present invention to reduce this number of write operations so that the availability of CPU 100 is increased and bus transfers are reduced.

Figure 3:
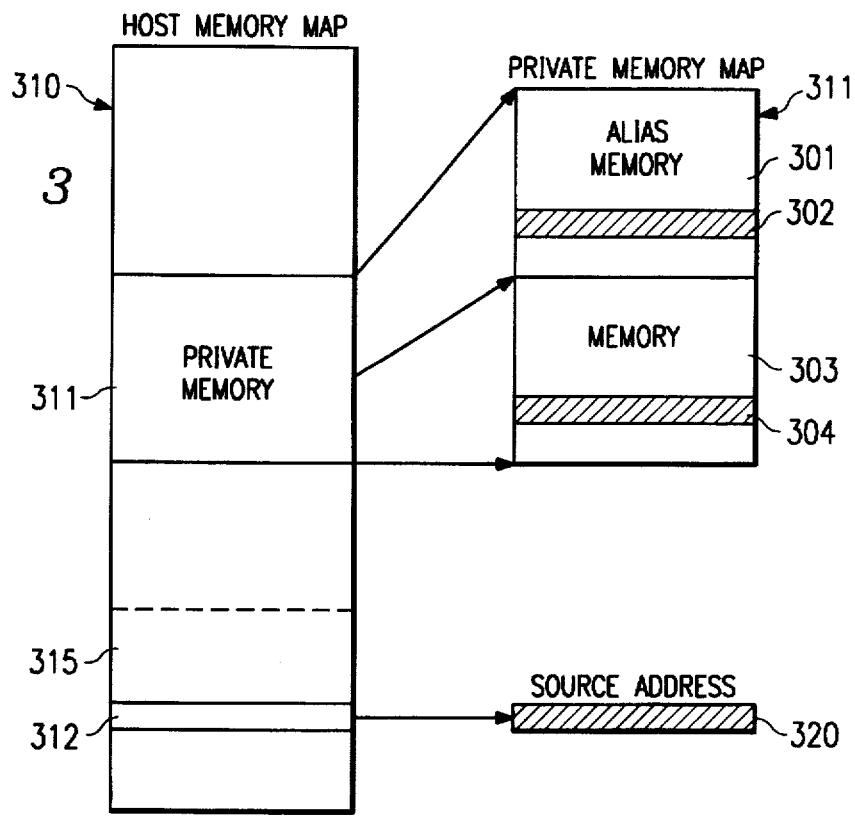
FIG. 3 illustrates a memory map in accordance with one embodiment of the present invention.

Referring next to FIGS. 1 and 3, there is illustrated one embodiment of the present invention. During the remainder of the discussion, DMA device 102 is configured so that it is operable in accordance with the present invention.

Item 310 within FIG. 3 represents the host memory map of address space within system 10. Memory map 310 represents every address of memory within system 10. RAM 140 occupies address space 315 within memory map 310.

Private memory 311 represents the address space for display adapter 136. Within this address space 311, the present invention implements the actual display memory address space 303 along with an alias display memory 301.

In contrast to the prior art, registers 201 and 202 are not required within DMA device 102 for storing the source address and the destination address. However, the present invention may make use of register 203 for storing the length of the data to be transferred.

Note that the source address is represented by item 320 residing within the RAM memory space 315. However, as discussed above, the source data may originate from any device within system 10. In this example, the source data is stored by CPU 100 into RAM 140; thus, this is the reason that address 320 for the source data is represented as residing within an address location within RAM memory space 315.

This address location 312 within memory space 315 holds the display list. A display list may be data containing instructional and/or data information supplied to a graphics device for use in describing graphical primitives, such as points, lines and polygons.

As discussed above, the present invention replaces the three write operations to registers 201–203 described above with one write operation performed by CPU 100 to DMA device 102. Essentially, the alias destination address is equal to the actual destination address plus an offset, which may be equal to the length of memory capacity of the destination device, which is, in this example the memory capacity within display adapter 136. The data written by CPU 100 to DMA device 102 includes source address 320. Therefore, one write operation essentially contains the source address, the destination address and the length of the data to be transferred. The length of data may be fixed, a program count, or included in the alias address format. DMA device 102 determines the destination address by essentially subtracting the offset, which also produces the length, which may then be stored within register 203.

A typical operation is the transfer of bit-map data. The host device, CPU 100, determines source address 320 of the data residing within RAM 140. CPU 100 also determines destination address 304 of display adapter 136. CPU 100 then determines alias destination address 302 residing within address space 301 by adding to destination address 304 an offset number, which may be equal to the length of a memory device within display adapter 136. CPU 100 then writes source address 320 to alias destination address 302. After completing this write operation, CPU 100 is now able to continue processing of subsequent unrelated functions while DMA device 102 utilizes the information written to it to fetch the source data from RAM 140 for subsequent display by display device 138. DMA device 102 is able to do this by essentially performing the reverse operation that CPU 100 performs, i.e., DMA device 102 calculates destination address 304 from alias destination address 302, for example, by subtracting the length. DMA device 102 also retrieves source address 320 from the data written by CPU 100. Source address 320 may be stored within a register when written by CPU 100.

Private memory 311 may represent the memory of display adapter 136, or the memory of some other device such as a SCSI device or an MPEG decoder, which is a device that decodes video (recorded television, multiple frame animation) information previously encoded to MPEG (Motion Pictures Encoding Group).

Figure 4:
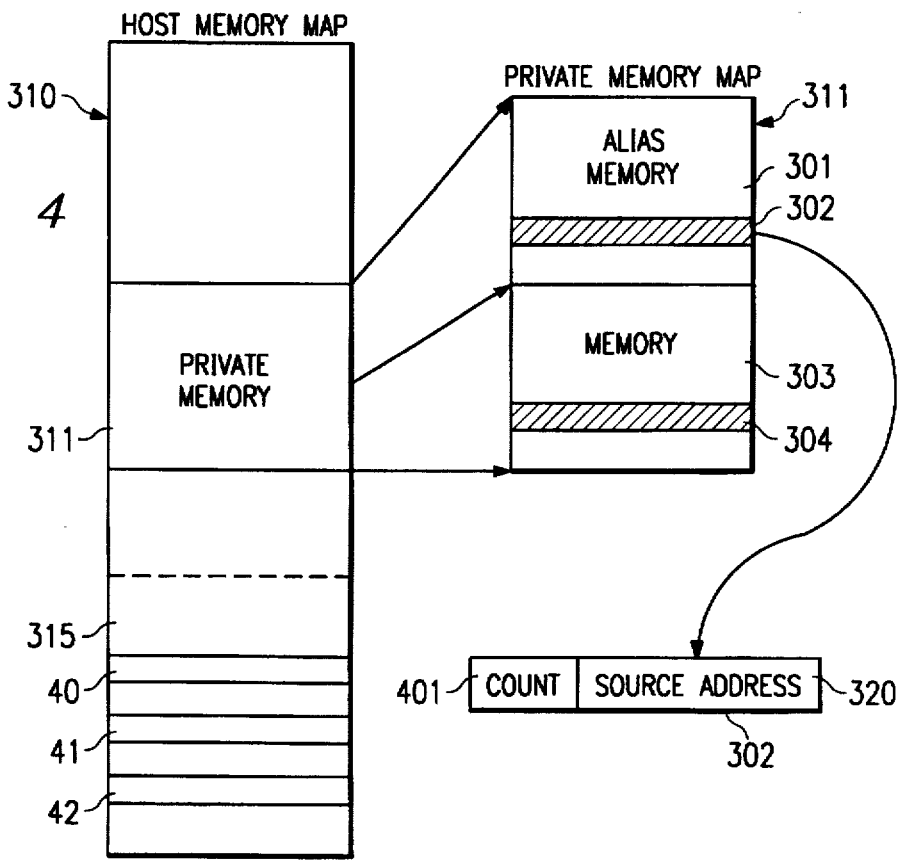
FIG. 4 illustrates a memory map in accordance with an alternative embodiment of the present invention.

Referring next to FIG. 4, there is illustrated an alternative embodiment of the present invention. Essentially, this alternative embodiment is similar to the embodiment described above with respect to FIG. 3, except that linked lists of data are now allowed to be transferred using the present invention. Such linked lists of data may be multiple display lists or video images that need to be transferred, or in the case of a SCSI device or a disk device, scattered data gathered from many locations for transfer to a slave device. Essentially, this alternative of the present invention creates multiple sequential transfers from one initial transfer. In FIG. 4, within memory map 310 there is shown address spaces 40, 41 and 42 for three separate display lists 504, 505 and 506, respectively, shown in FIG. 5. Again, these addresses are shown in relationship to address space 315 pertaining to RAM 140. As noted above, a display list may be the equivalent of executable code along with data utilized for displaying an image on display device 138.

Figure 5:
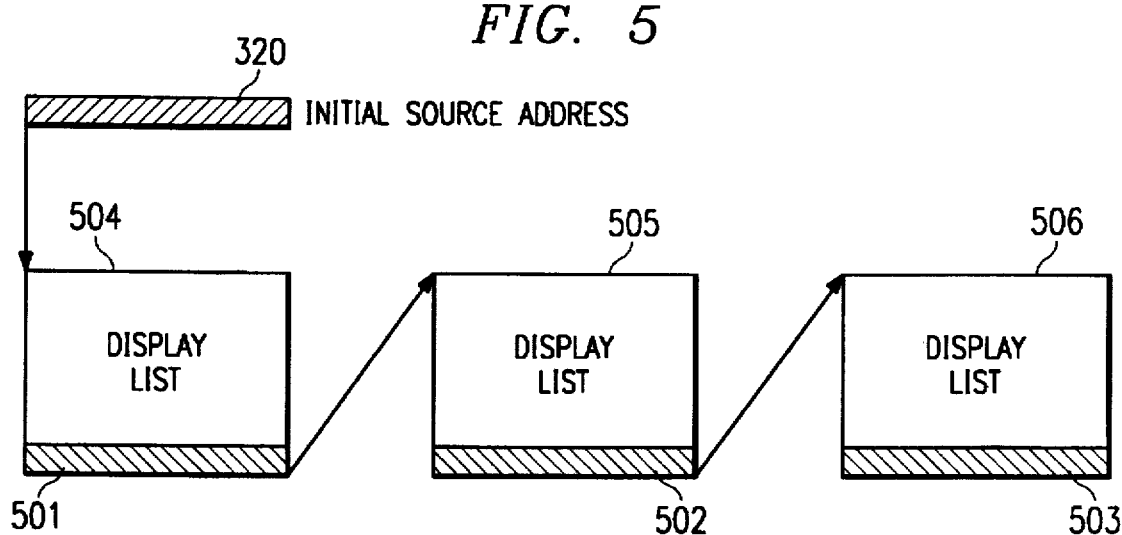
FIG. 5 illustrates the linking of display lists in accordance with the memory map illustrated in FIG. 4.

Refer now to both FIGS. 4 and 5, wherein FIG. 5 illustrates a representation of the linking of display lists 504, 505 and 506. Within display list 504 is link indicator 501, which points towards the beginning of display list 505. Display list 505 includes link indicator 502, which points towards display list 506. At the end of display list 506 is "don't care" indicator 503. "Don't care" indicator 503 may be arbitrary. Address 0X00000000 (hexadecimal or base 16 format) could be used, but must not encompass the host address space or the device used.

Essentially, CPU 100 writes source address 320, as described above, to alias destination address 302. As illustrated in FIG. 4, along with source address 320, CPU 100 also writes a count number 401 to alias destination address 302. Source address 320 will point towards display list 504. Thus, DMA device 102 will read source address 320 and begin transfer of display list 504 to display adapter 136. Once DMA device 102 reaches the count 401 indicated within the data transferred along with source address 320, it will read link indicator 501, which points to the next source address indicating the beginning of display list 505. Likewise, once the end of display list 505 has been read, DMA device 102 will read link indicator 502 pointing towards the beginning of display list 506. At the end of display list 506 is "don't care" indicator 503.

Each display list could represent video data. DMA device 102 might transfer until it reached the count value 401 and then would wait for a video blanking cycle to occur before beginning transfer of the next display list.

The link indicators could also be triggers linking image data with text data. DMA device 102 can detect a link indicator when the count indicator reaches the transfer size (end of transfer). DMA device 102 can then check the data read from the host device for another link indicator or an end-of-transfer indicator.

For example, if the block (count) size is 2 k bytes, and the data to be transferred is in host memory (e.g., RAM 140) at addresses 0X00001000 and 0X00004000, and the link indicator is at address 0X000017FF, then the data at this link indicator will be 0X00004000. If the next link indicator is at 0X0000047FF and its data is a "don't care" (0X00000000), then this will stop the data transfer.

Figure 6:
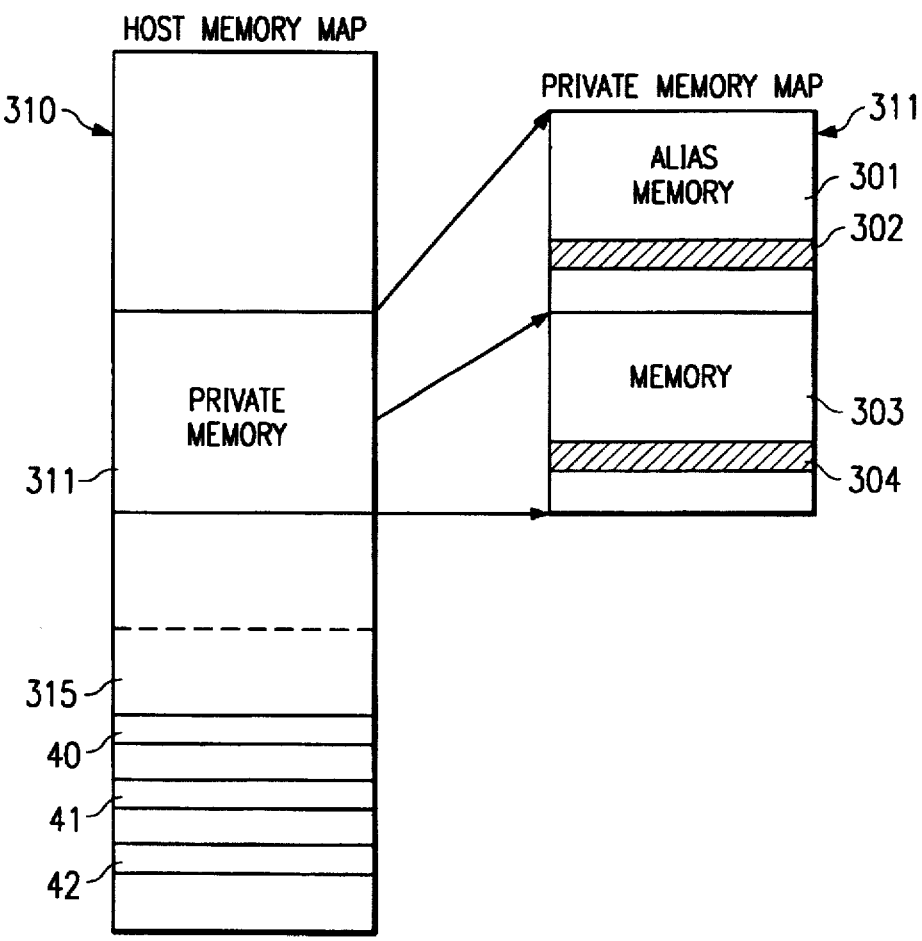
FIG. 6 illustrates a memory map in accordance with another alternative embodiment of the present invention.

Referring next to FIGS. 6 and 7, there is illustrated another alternative embodiment of the present invention utilizing linked display lists. Essentially, this embodiment is the same as that described above with respect to FIGS. 4 and 5, except for that "don't care" indicator 503 has now been replaced with "stop" indicator 701, and the count parameter 401 sent along with source address 320 to alias destination address space 302 has been omitted. Essentially, the operation is the same except that DMA device 102 will continue the transfer of data until reaching the "stop" indicator 701. The "stop" indicator 701 could be all zeros.

The advantages of the alternative embodiments illustrated with respect to FIGS. 5–7 is that host device 100 is not required to take control of the transfer of data until a significant mount of time later after the transfer of the linked display lists. For example, instead of merely transferring one frame of data, slave device 102 may transfer several frames of data before requiring CPU 100 to again take control and issue another source address for data to be transferred to the slave device.

Referring next to FIG. 8, there is illustrated a block diagram showing a hardware configuration to be added to typical DMA device 102 in order to implement the present invention. As noted above, the host device 100 writes an [address:data] to the alias address space. The format of this [address:data] is as illustrated in FIG. 8. The data portion of N-bits is the source address 320. This is the address within the source device (e.g., RAM 140) from where the data to be transferred begins. The M bits represent an optional block count for transfers of multiple blocks of data. The L bits are the destination block within the host memory map indicating the size of the block of data to be transferred. The destination block in DMA device 102 memory is given by dividing the destination memory length (length of memory or device) by the block size. For example, if a device is 1024×1024 bytes long, or 1 Megabyte, and the block size is 1024, then it has 1024 blocks. Destination addresses are aligned to block boundaries (even multiples of block addresses). The K bits are the alias address that DMA device 102 will be looking for to indicate that the associated destination device (e.g., adapter 136) is to receive some data from the host device.

An example transaction in accordance with the present invention might begin as a transfer of 2 k bytes from source address 0X00001000 (e.g., within RAM 140) to destination address 0X10000200 (e.g., within adapter 136). The destination device address may be 0X10000000 with an address size of 0X01000000 making the alias address for the destination device to be 0X11000000. The [address:data] written from host device 100 to DMA device 102 may then be [0X11000201:0X00001000]. The "01" bits at the end of the address portion correspond to the M bits corresponding to a block count, i.e., the number of blocks to be transferred. The "11" bits within the address portion correspond to the alias address of the destination device. This portion corresponds to the K bits and is decoded by alias decode 801 indicating to DMA device 102 that this data being transferred on bus 112 is intended for display adapter 136. These K bits will also indicate to DMA device 102 that this is a "write" of data from the host device to display adapter 136.

The address portion above may be masked with 0XFFFFFF00 to ignore the block count.

Referring to both FIGS. 8 and 9 in combination, system 10 resides at an idle state in step 901. In step 902, the host device writes the [address:data] onto bus 112. This [address:data] is received by elements 801–804 in FIG. 8. Alias decode block 801 will look at the K bits to determine if this address matches the alias address, and in response to a match, block 801 will produce an alias SELECT signal that is then provided to counters 802–804.

The L bits are entered into counter 802; the M bits are entered into counter 803; and, the N bits are entered into counter 804. Counters 802–804 are loaded in response to receipt of the Alias Select signal from block 801. Decode block 801 and counters 802–804 are well-known circuits.

In step 903, DMA device 102 will then read data from DMA device 102 at the source address first provided as the N bits to host source counter 804. DMA device 102 reads address N from RAM onto Bus 112. In step 904, DMA device 102 receives this data from the host device, it will write it to the first destination address supplied to DMA device 102 by destination address counter 802 as the L bits. The L bits correspond to the physical address within the destination device to where DMA device 102 writes the data retrieved from the source address.

Next, in step 905, the host source address within counter 804 is incremented and supplied to DMA device 102, which will then use this incremented source address to send to the host device instructing it to send the data associated with that incremented source address. In step 906, the destination address is incremented within block 802 and supplied to DMA device 102, which indicates to DMA device 102 what next address within display adapter 136 to store the data received from the host device corresponding to the above incremented source address.

In step 907, a test is performed within DMA device 102 to determine if the incremented host source address received from host source counter 804 corresponds to a predetermined bit pattern, which would indicate to DMA device 102 that the entire block of data intended to be transferred has been transferred. The predetermined pattern could indicate to DMA device 102 that the incremented source address received from counter 804 corresponds to the block size intended to be transferred. The block size may be predetermined or determined dynamically. If this end of transfer bit pattern is not noticed, then the process returns to step 903 to read the data from the incremented source address. Next, in step 904, the data is read from the source to the destination address. And, in steps 905 and 906, the process is continued by incrementing the source and destination addresses through devices 804 and 802, respectfully.

In step 907, once the predetermined bit pattern is monitored as being received from host source counter 804 indicating an end of the transfer of that block of data, then the process will proceed to step 908 to test if another block of data is to be transferred by monitoring a value received from block counter 803. If this test determines that not all of the blocks of data have been transferred, then the process will return to step 903 to begin the transfer of data associated with the next block of data. However, if all of the blocks of data have been transferred, then the process returns system 10 to an idle state in step 909.

The flow diagram illustrated in FIG. 9 is implemented within a state machine within DMA device 102. Any well-known DMA device 102 may be programmed by one skilled in the art with the flow of steps illustrated in FIG. 9.

Although the present invention and its advantages have been described in detail, it should be understood that various changes, substitutions and alterations can be made herein without departing from the spirit and scope of the invention as defined by the appended claims.

What is claimed is:

1. In a data processing system, a method for initiating a transfer of data between source and destination devices, said method comprising the steps of:

determining a source address indicating a source location associated with said source device where said data currently resides within said data processing system;

determining a destination address indicating said destination device to where said data is to be transferred within said data processing system;

determining a length of said data to be transferred;

writing said source address to a location corresponding to an alias destination address, wherein said alias destination address is determined by combining said destination address and said length, and further wherein said length and said source address are provided to said destination device in a single operation;

retrieving by said destination device said source address from said location corresponding to said alias destination address;

retrieving by said destination device said tenth from said alias destination address; and retrieving by said destination device said data from said source location using said source address and said length.

2. The method as recited in claim 1, wherein said alias destination address is determined by adding said length to said destination address.

3. The method as recited in claim 1, wherein said source address, said destination address, and said alias destination address reside within an address space of a host device coupled to said data processing system.

4. The method as recited in claim 1, wherein said destination address is an address of memory in a slave device coupled to said data processing system.

5. The method as recited in claim 1, wherein said writing step consists of only one write operation initiated by a host device coupled to said data processing system.

6. The method as recited in claim 1, wherein said length is dependent upon a memory capacity of a slave device coupled to said data processing system and associated with said destination address.

7. The method as recited in claim 1, wherein said source address is written by said writing step to a direct memory access device associated with said destination address, wherein said direct memory access device derives said destination address and said length from said writing of said source address to said alias destination address.

8. The method as recited in claim 7, further comprising the steps of:

retrieving said data by said direct memory access device using said source address; and sending said retrieved data to a slave device associated with said destination address.

9. The method as recited in claim 1, wherein said data is a display list to be used by a slave device associated with destination address to display an image on a display device coupled to said data processing system.

10. The method as recited in claim 1, wherein said source address indicates a first address of N linked groups of data, wherein N is an integer greater than 1, and wherein an end of each of the first N-1 linked groups of data contains a link indicator pointing to a next linked group of data.

11. The method as recited in claim 10, wherein an end of the Nth linked group of data contains a stop indicator notifying a recipient of said N linked groups of data that it has received all N linked groups of data.

12. The method as recited in claim 10, wherein said writing step also sends a count parameter along with said source address to said alias destination address, wherein a recipient of said N linked groups of data continues said transfer of said N linked groups of data until said count parameter is reached.

13. The method as recited in claim 1, further comprising the steps of:

retrieving said data using said source address;

writing said retrieved data to said destination address;

incrementing said source address to compute an incremented source address;

incrementing said destination address to compute an incremented destination address;

retrieving data from said incremented source address; and writing said retrieved incremented source address to said incremented destination address.

14. The method as recited in claim 13, further comprising the step of:

testing if said incremented source address is a predetermined pattern indicating that a predetermined block of data has been transferred.

15. The method as recited in claim 13, wherein said writing step writes a block count indicating a number of blocks of data to be transferred, said method further comprising the steps of:

testing if said number of blocks of data has been transferred; and ending the transfer of data.

16. In a data processing system, a method for transferring data comprising the steps of:

determining, by a host device coupled to said data processing system, a source address for said data to be transferred, wherein said source address indicates a relative location of said data within a memory space associated with said host device;

determining, by said host device, a destination address associated with a slave device coupled to said data processing system, wherein said data is to be transferred to said destination address, wherein said destination address is within said memory space;

determining, by said host device, a length of said data to be transferred;

determining, by said host device, an alias destination address, wherein said alias destination address is determined by combining said destination address and said length;

writing, by said host device, said source address to a location corresponding to said alias destination address, wherein said length and said source address are transferred to said slave device in a single operation;

retrieving, by said slave device, said source address written to said alias destination address;

retrieving, by said slave device, said length from said alias destination address; and retrieving, by said slave device, said data using said source address and said length.

17. The method as recited in claim 16, wherein said host device writes a count to said alias destination address along with said source address.

18. The method as recited in claim 17, wherein said data is a plurality of linked data lists, wherein said source address indicates a beginning of said plurality of linked data lists, and wherein said slave device retrieves said plurality of linked data lists until said count is reached.

19. The method as recited in claim 16, wherein said data is a plurality of linked data lists, and wherein a last one of said plurality of linked data lists contains a stop indicator, wherein said slave device retrieves said plurality of linked data lists until said stop indicator is reached.

20. A data processing system comprising a processor, a memory device, permanent storage, and one or more slave devices coupled to a system bus, said processor further comprising:

means for determining a source address for data to be transferred from one location within said data processing system to one of said one or more slave devices, wherein said source address indicates a relative location of said data within a memory space associated with said processor;

means for determining a destination address associated with said one of said one or more slave devices, wherein said data is to be transferred to said destination address, wherein said destination address is within said memory space;

means for determining a length a said data to be transferred;

means for determining an alias destination address, wherein said alias destination address is determined by combining said destination address and said length;

means for writing said source address to a location corresponding to said alias destination address;

wherein said length and said source address are provided to said one of said one or more slave devices in a single operation; and further wherein said one of said one or more slave devices further comprises:

means for retrieving said source address written to said location corresponding to said alias destination address;

means for determining said length from said alias destination address; and means for retrieving said data using said source address and said length.

21. The data processing system as recited in claim 20, wherein said source address indicates a first address of N linked groups of data, wherein N is an integer greater than 1, and wherein an end of each of the first N−1 linked groups of data contains a link indicator pointing to a next linked group of data.

22. The data processing system as recited in claim 21, wherein an end of the Nth linked group of data contains a stop indicator notifying said one of said one or more slave devices of said N linked groups of data that it has received all N linked groups of data.

23. The data processing system as recited in claim 21, wherein said writing means also sends a count parameter along with said source address to said alias destination address, wherein said one of said one or more slave devices of said N linked groups of data continues said transfer of said N linked groups of data until said count parameter is reached.

24. The data processing system as recited in claim 21, wherein said N linked groups of data are N linked display lists, and wherein said one of said one or more slave devices is a display adaptor coupled to a display device, said display device including a direct memory access device coupled to said system bus, and wherein said display adaptor uses said retrieved N linked display lists to display images on said display device.

25. The data processing system as recited in claim 20, further comprising:

means for writing said retrieved data to said destination address;

means for incrementing said source address to compute an incremented source address;

means for incrementing said destination address to compute an incremented destination address;

means for retrieving data from said incremented source address; and means for writing said retrieved incremented source address to said incremented destination address.

26. The data processing system as recited in claim 25, further comprising:

means for testing if said incremented source address is a predetermined pattern indicating that a predetermined block of data has been transferred.

27. The data processing system as recited in claim 20, wherein said writing means writes a block count indicating a number of blocks of data to be transferred, said system further comprising:

means for testing if said number of blocks of data has been transferred; and means for ending the transfer of data.

28. A direct memory access ("DMA") device comprising:

means for retrieving a source address written into a location corresponding to an alias destination address, said alias destination address is determined by combining a destination address associated with a destination device associated with said DMA device and a length of data being accessed, wherein said length and said source address are provided to said destination device in a single operation;

a decode means for decoding said alias destination address;

means for retrieving said data from a location corresponding to said source address;

means for writing said retrieved data to a location corresponding to said destination address;

first counter means for incrementing said source address;

second counter means for incrementing said destination address;

means for retrieving data from said incremented source address; and means for writing said retrieved data to a location corresponding to said incremented destination address.

29. The DMA device as recited in claim 28, further comprising:

means for testing if said incremented source address is a predetermined pattern indicating that a predetermined block of data has been transferred;

means for testing if a number of blocks of data have been transferred; and means for ending the transfer of data.

* * * * *